United States Patent [19]
Kimball

[11] Patent Number: 5,084,920
[45] Date of Patent: Feb. 4, 1992

[54] WATER RECYCLING SYSTEM

[76] Inventor: James L. Kimball, R.R. 1 Box 1570, North Waterford, Me. 04267

[21] Appl. No.: 467,785

[22] Filed: Jan. 19, 1990

[51] Int. Cl.⁵ .............................................. A47K 4/00
[52] U.S. Cl. ...................................... 4/665; 4/DIG. 3
[58] Field of Search ................. 210/136, 104; 4/661, 4/65, 317, 318, 300, 600, 664

[56] References Cited

U.S. PATENT DOCUMENTS

| | | | |
|---|---|---|---|
| 1,303,358 | 5/1919 | Montgomery | 4/317 |
| 2,858,939 | 11/1958 | Corliss | 210/136 |
| 3,005,205 | 10/1961 | Breen | 4/664 X |
| 3,112,497 | 12/1963 | Call | 4/415 X |
| 3,318,449 | 5/1967 | Jennings et al. | 210/104 |
| 3,505,690 | 4/1970 | Lockwood | 4/317 |
| 3,594,825 | 7/1971 | Reid | 4/663 |
| 3,815,159 | 6/1974 | Delaney | 4/317 |
| 3,922,730 | 12/1975 | Kemper | 4/318 |
| 4,017,395 | 4/1977 | Davis | 4/317 X |
| 4,040,956 | 8/1977 | Selwitz | 4/318 X |
| 4,115,879 | 9/1978 | Toms | 4/318 |
| 4,162,218 | 7/1979 | McCormick | 4/665 X |
| 4,197,597 | 4/1980 | Toms | 4/600 |
| 4,358,864 | 11/1982 | Medrano | 4/665 |
| 4,359,789 | 11/1982 | Roberts | 4/300 |
| 4,924,536 | 5/1990 | Houghton | 4/415 X |

OTHER PUBLICATIONS

Demonstration of Waste Flow Reduction from Households, Environmental Protection Technology Series, Sep. 1974, pp. 43-44, EPA, Cincinnati, Ohio.

Primary Examiner—Henry J. Recla
Assistant Examiner—Robert M. Fetsuga
Attorney, Agent, or Firm—Cesari and McKenna

[57] ABSTRACT

A water recycling system for re-use of gray water to flush toilet wastes is disclosed. Gray water from various sources, after filtration, is reserved in a water storage tank to be delivered to a water closet for flushing purposes. Disinfectant is periodically added to the gray water in the storage tank. Upon flushing, electrical signals are sent for replenishing of gray water from the storage tank to the water closet and supplying the toilet bowl with fresh water at a later time when the water closet is emptied and the wastes are flushed. A syphoning device is provided to further remove the gray water and wastes in the toilet bowl to the septic tank or sewage line. Filling of the water closet terminates the inflow of both gray and fresh water. At the completion of each flushing-filling cycle, the water closet is filled with gray water and the toilet bowl contains largely fresh water.

21 Claims, 1 Drawing Sheet

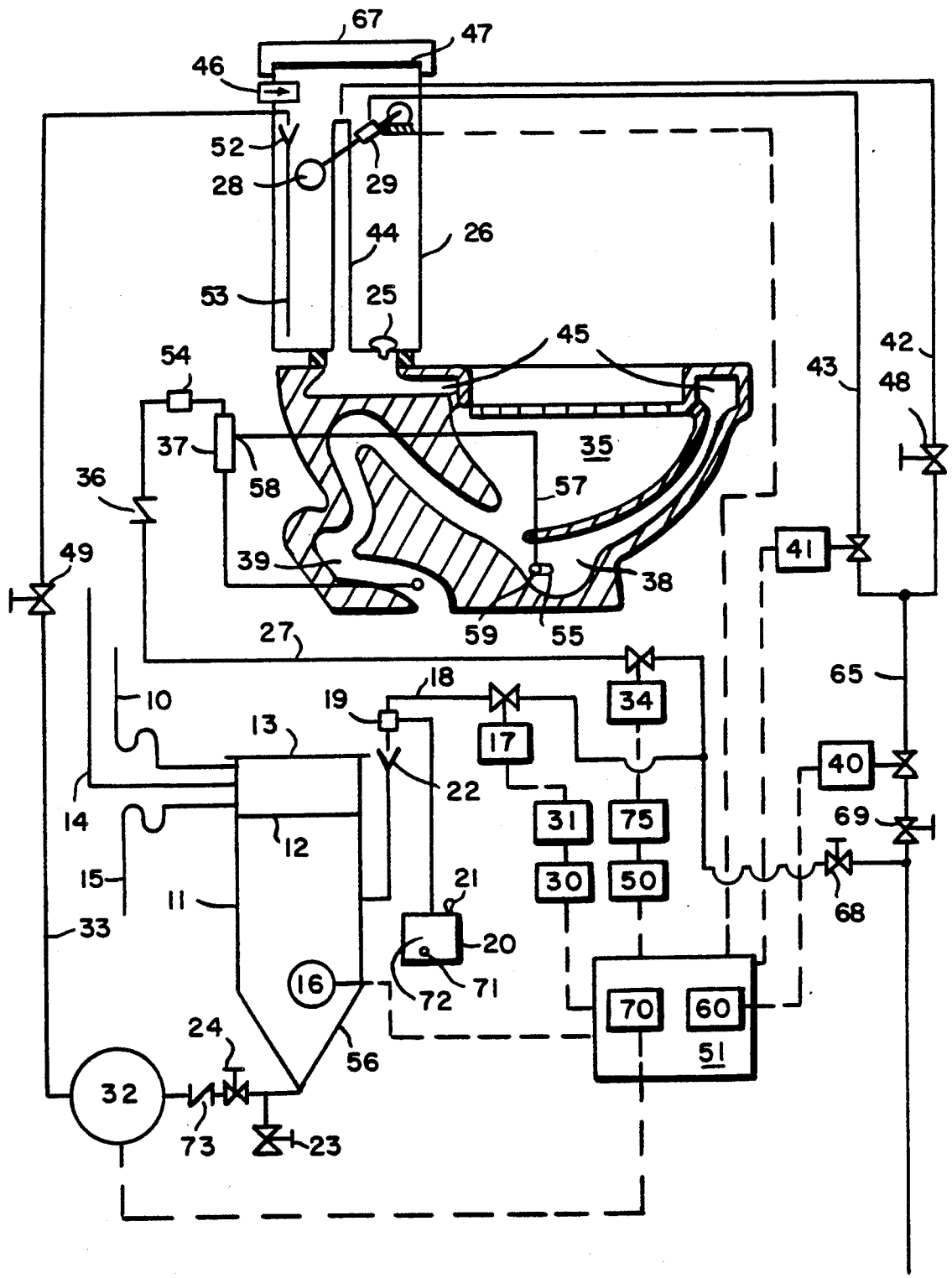

WATER RECYCLING SYSTEM

FIELD OF THE INVENTION

This invention relates generally to a water recycling system for re-use of gray water. It relates more particularly to the re-use of gray water discharged from the sinks, showers, bath tubs, laundry washing machines, and the like for sanitary purposes such as flushing of toilet wastes.

BACKGROUND OF THE INVENTION

Prior to the Industrial Revolution, improvement in the technology for disposal of human wastes was very slow. Virtually no progress was made from the time of the Romans until the 19th century. Outbreaks of epidemics were often spread by the consumption of water contaminated with human wastes. Eventually, the epidemics were curbed by the development of separate and underground systems for treating human wastes.

While modern waste disposal systems have contributed greatly in the diminution of the spread of epidemics, they also demand vast quantities of water for the treatment of human wastes. In the water closet of a standard toilet fixture, where proper functioning is predicated upon the provision of a proper amount of water, usually several gallons of water are required to carry off the waste contained in the toilet bowl.

Through industrialization, urbanization and population growth, many sources of fresh water have been eliminated or so contaminated as to be rendered unfit for human consumption. As a result, the demand for economical use of fresh water has become ever greater, especially in areas where fresh water supply is inadequate.

It has been shown that great amounts of fresh water are consumed in a typical household nowadays, only a small fraction of which is utilized for consumption or food preparation. Most of the water is employed for laundry purposes, baths or showers, washing, watering lawns or gardens, and in the disposal of human wastes.

The term "gray water" commonly refers to the major portion of the water utilized in human activities, which includes all of the waste currently handled by sewage systems excepting only the toilet waste product. While gray water is usually soiled by dirt, soap, detergent, or the like and is not potable, it is quite suitable to be used to flush human wastes in toilet fixtures.

Several patents have been issued with respect to recycling of gray water for use in the water closets of toilet fixtures.

For example, Jennings et al U.S. Pat. No. 3,318,449, Toms U.S. Pat. Nos. 4,115,879, and 4,197,597 all disclose a gray water recycling system consisting of a gray water storage tank, a fresh water feed into the storage tank, a filtration device, and one or more toilet fixtures. A similar system was taught by Reid in U.S. Pat. No. 3,594,825 to be used on human conveyances such as camping trailers and boats.

Although the present invention applies a similar gray water recycling system to flush toilet wastes, it is distinguished over the above-referenced patents in that it ensures that, after flushing, fresh water fills the generally visible and exposed toilet bowl while gray water fills the generally enclosed water closet of the toilet fixture.

All of the prior inventions relating to re-use of gray water for flushing toilet wastes share one common and distinctive drawback, i.e. after flushing, the gray water, which is usually malodorous and discolored, remains in the toilet bowl. As a result, the mere presence of the gray water causes the user much repugnance. More seriously, the gray water in the toilet bowl constitutes a significant health hazard as it is probable that the gray water may splash and come in contact with body parts of the user during use of the toilet. Both shortcomings have been overcome in this invention.

SUMMARY OF THE INVENTION

It is, therefore, a primary object of the present invention to provide an improved gray water recycling system which enables one to reduce water and sewer expenses by decreasing potable water usage and overall water discharge via re-use of gray water for flushing toilet wastes or the like.

It is another object of the present invention to provide a gray water recycling system of the type described in which fresh water is used to fill the toilet bowl after each flushing of wastes with gray water, thereby providing the appearance of normalcy to the toilet fixture or fixtures involved.

It is a further object of the present invention to provide a gray water recycling system of the type described which enables economical utilization of water by collecting and storing the gray water in a tank for re-use in the system.

A related object of the present invention is to provide a gray water recycling system which is capable of using fresh water to flush toilet wastes when the supply of gray water to the system is not adequate.

Another related object of the present invention is to provide a gray water recycling system which is capable of flushing toilet wastes with fresh water during power failure and the like.

These and other objects of the present invention will become more apparent as the description thereof proceeds.

In accordance with an illustrative embodiment of the present invention, gray water from a household tub, shower, laundry washing machine, or the like is conducted through one or more conduits to a storage tank in which filters are provided to remove debris and disinfectant is added to kill germs. A second conduit connects the storage tank through a pump to the water closet of one or more toilet fixtures disposed in the facility serviced by the recycling system.

Two sensing means are present in the gray water recycling system embodied according to this invention. The first sensing means is provided within the storage tank and serves to disable the pump that conveys the gray water from the storage tank to the water closet of the toilet fixture when the amount of gray water in the tank is below a preset level. This prevents any damage to the pump due to lack of gray water for suction. The second sensing means is provided in the water closet to detect the flushing of water from the water closet so as to actuate both a delayed inflow of gray water from the storage tank into the water closet and a delayed inflow of fresh water into the toilet bowl.

In accordance with the illustrative embodiment of the invention described in detail below, time delays, which are energized either simultaneously or sequentially by the second sensing means upon flushing the water closet, are preset in such a way that the filling of the water closet with gray water and the supplying of fresh water to the toilet bowl are started at proper times. Upon replenishment of gray water in the water closet, the second sensing means operates to turn off both the inflow of gray water to the water closet and fresh water to the toilet bowl. The flow rates of fresh water into the water closet and toilet bowl are pre-adjusted by in-line valves so that the replenishment of the water closet and the filling of the toilet bowl to a preset level are completed at essentially the same time.

A syphon tube is provided near the bottom of the toilet bowl to drain gray water from the bowl during the flushing cycle. In the embodiment of the invention described herein, a partially covered or obstructed cavity is provided at the bottom of the toilet bowl to conceal from view any gray water that may remain in the bowl at the completion of the flushing cycle. An additional time delay is also provided and preset in such a manner as to start and terminate the gray water depletion cycle through the syphon tube at proper times.

In addition, a DC voltage source, as well as a pair of pressurized water supply conduits, are provided so that fresh water can still be delivered automatically to both the water closet and the toilet bowl after flushing in the event of either a power failure or a low supply of gray water in the storage tank.

BRIEF DESCRIPTION OF THE DRAWING

The above and further advantages of the invention may be better understood by referring to the following detailed description in conjunction with the accompanying sole drawing which provides a diagrammatic representation of a gray water recycling system embodied in accordance with the teachings of the present invention. In the drawing, electrical connections are represented by dotted lines, while conduits used to convey water are represented by solid lines.

DETAILED DESCRIPTION OF THE ILLUSTRATIVE EMBODIMENT

Referring to the drawing, gray water to be re-used from various sources, such as a household bath tub, shower, laundry washing machine, or the like, is collected and conducted through a conduit 10, via a screen 12, into a storage tank 11. The screen 12 serves to filter the gray water by retaining solid materials, such as hair, lint and the like, which are commonly present in the gray water. The filtered gray water may be subjected to a second filtration, if desired, by passing through a finer screen (not shown) which is mounted within the storage tank 11 slightly below the screen 12 for removing smaller solid particles from the gray water. It is intended to preclude materials which may cause malfunction of working components of the system. It will be understood that the exact construction and design of the filtering devices is not critical to the invention herein, and may depend upon the particular source and nature of the water to be re-used.

The storage tank 11, which serves as a reservoir for the recycling system, is preferably provided with a conical bottom 56 and may be made of any suitable material, such as plastic or metal with epoxy coating. A conical bottom 56 is preferred for the tank 11 because such a construction, unlike a flat-bottomed tank, avoids an accumulation of solids and associated bacterial growth inside the tank 11 particularly where, as here, the outlet of the tank 11 is located at the tip of the conical bottom. It will also be noted that in this embodiment the storage tank 11 is disposed at a level below that at which the gray water sources are located. As a result, conventional gravity flow to the storage tank 11 suffices the purpose of collecting the gray water from various sources in the facility serviced by the system. The gray water may also be pumped to the tank 11 in those cases where gravity feed is not practical.

The storage tank 11 is connected by a second conduit 33 to a water closet 26 of a toilet fixture in the facility, which in this illustrative embodiment is disposed at a level above that of the storage tank 11. A pump 32 is disposed in the conduit 33. The pump 32 and all other electrical devices to be mentioned hereinafter are electrically connected to an electrical control panel 51 mounted at a convenient location in the facility. When activated, the pump 32 pumps gray water from the tank 11 through conduit 33 to the water closet 26. The removal of solid materials from the gray water by the screen 12 as mentioned hereinbefore helps prevent damage to the pump 32 caused by such materials. A check valve 73 is provided in the conduit 33 upstream from and proximate to the pump 32 to maintain the prime for the pump 32. Also provided in the conduit 33 is a drain valve 23 for clean-out of the storage tank 11 as desired.

There may be times when, due to various causes, the gray water is over supplied to the storage tank 11. Such excess water may be permitted to flow to existing sewer lines through an overflow conduit 15. At other times, the supply of gray water may be too low to fill the storage tank 11 to a selected minimum level. In order to prevent any damage to the pump 32 due to lack of water for suction, sensing means, such as a float switch 16, is pivotally installed near the conical bottom 56 of the storage tank 11 and operatively connected to the electrical control panel 51. The float switch 16 serves to render the pump 32 inoperative when the water in the tank 11 is below the selected minimum level.

As the gray water may become malodorous upon prolonged storage, it is preferable that a cover 13 be provided for the storage tank 11 to prevent escape of the unpleasant odors. It is desirable that the cover 13 be removable so that access to the inside of the tank 11 and the screen 12 can be gained for cleaning, maintenance, inspection and repair. In this embodiment, the tank 11 is also vented to the atmosphere through a ventilation pipe 14.

Disinfectant material, such as liquid chlorine from a chlorine supply container 20, is added to the storage tank 11 in a preset amount at regular time intervals. In the embodiment shown in the drawing, an eductor 19 connected to a pressurized water supplying conduit 18 is provided for conveying liquid chlorine from the chlorine supply 20 to the tank 11. Installed upstream from the eductor 19 in the conduit 18 is a solenoid valve 17 which is controlled by two time control devices 30 and 31. The valve 17 is normally in a closed position. The time control devices 30 and 31, which are electrically connected to the electrical control panel 51, control respectively the time of day and duration of the opening of the valve 17. More particularly, the time control device 30 operates to actuate the time control device 31 to open the valve 17. Thus, for example, the time control device 30 may be set to open valve 17 at two hour intervals each day, while the time control device 31 may be set to close the valve 17 a selected number of seconds after it is opened by the time control device 30. As a result, addition of chlorine to the tank 11, which is a function of the time that the valve 17 is open and the volume of flow of water through the eductor 19, is automatically regulated.

A one-way valve 21 is provided on the surface of the container 20 which allows air to enter the container 20, thereby preventing the container 20 from collapsing as the chlorine is depleted, while preventing the escape of chlorine gas from the container into the ambient atmosphere. Also, it is preferable that in the container 20 a check valve 71 be provided in the tubing 72 connecting the eductor 19 and the container 20. The check valve 71 serves to prevent chlorine in the tubing 72 from flowing back into the container 20 when the water flow stops upon closing of the valve 17.

Referring now to the toilet fixture used in conjunction with the system of this invention, it comprises three major parts: the water closet 26 referred to above, a toilet bowl 35 which has a partially concealed cavity 38 at its bottom, and a flushing conduit 45 which interconnects the water closet 26 and the toilet bowl 35. The toilet bowl 35 is typically disposed below the water closet 26. The flushing conduit 45 is opened by raising a flapper valve 25 via the lowering of a flushing lever (not shown) disposed external to the water closet 26, the flapper valve 25 and the flushing lever being mechanically connected to each other and of any conventional design. Upon opening of the flushing conduit 45, the gray water in the water closet 26 flows through the flushing conduit 45 to flush out wastes present in the toilet bowl 35. In a conventional manner, the flushing conduit 45 is closed as the flapper valve 25 returns to its normal position when the gray water in the water closet 26 is nearly depleted.

Upon flushing the water closet 26, a float 28 pivotally mounted within the water closet 26 lowers as the water level falls. The float 28 is mechanically coupled to an electrical switch 29 also mounted within the closet 26. The switch 29 in turn is electrically connected to the electrical control panel 51. Lowering of the float 28 operates the switch 29, which in turn, actuates three time delay relay devices 50, 60, and 70 associated with the electrical control panel 51. Upon lowering of the float 28, the switch 29 also operates to close immediately a first solenoid valve 41 which is provided in a branch conduit 43 for conveying pressurized fresh water to the water closet 26 and is normally in an open position. As will be discussed in detail below, the time delay relay devices 50, 60, and 70 function to open a second solenoid valve 34 (via timer 75), and a third solenoid valve 40 (via DC current), both of which are normally in a closed position, and to start the pump 32, respectively, at three different time points after the water closet 26 is flushed.

In this embodiment, the time delay relay device 70 is adjusted so as to start the pump 32 to replenish the water closet 26 with a new batch of gray water from the storage tank 11 through the conduits 33 and 53 when the water level in the closet 26 has receded approximately halfway. However, it should be noted that, except for conservation of gray water, the pump 32 can be preset to start at any time after the water in the water closet 26 flushes into the toilet bowl 35. As the inflow rate of gray water into the water closet 26, which can be preset by an adjustment valve 49, is typically lower than its outflow rate therefrom, the water level in the water closet 26 continues to decrease until the closet 26 is essentially empty thereby causing the flapper valve 25 to close. When the gray water continues to flow in and fills the water closet 26 to a preset level, the pump 32 is turned off via the coupled action of the float 28 and the switch 29. To prevent water in the water closet 26 from syphoning to the storage tank 11 due to gravitational force, an air break 52 is provided between the conduit 33 and the conduit 53 inside the water closet 26.

All three solenoid valves 34, 40, and 41 are installed in conduits which supply pressurized fresh water to the toilet fixture. More specifically, the valve 34 is installed in conduit 27, the valve 40 in conduit 65, and the valve 41 in conduit 43. In this embodiment, the conduit 43 is a branch of the conduit 65 for reasons to be set forth hereinafter. These fresh water supplying conduits may be typical water pipes. As mentioned above, the solenoid valves 34 and 40 are normally in a closed position, while the solenoid valve 41 is normally in an open position.

The time delay relay device 50 operates to actuate the timer 75 at a preset time point which in turn opens the valve 34 for a preset duration of time. More specifically, the time delay relay device 50 is set in such a manner so that it operates to open the valve 34 via the timer 75 at a time point when or after the wastes in the toilet bowl 35 have been flushed and before the fresh water is conveyed to the bowl 35. The timer 75, on the other hand, is preset to open the valve 34 for such a duration of time as to allow depletion of gray water which remains in the bowl 35 after flushing by a mechanism to be described below immediately.

When the water closet 26 is flushed, the gray water stored therein passes through the flushing conduit 45 and into the toilet bowl 35. This creates a syphoning effect as water passes into the septic tank or sewage line through passageway 39, resulting in removal of most of the water and wastes from the bowl 35. To more thoroughly remove the water and wastes, an eductor device 37 is provided in the conduit 27 which connects to the passageway 39 at a point below the bowl 35. Also provided is a syphon tube 57 which has one end 58 connected to the eductor 37 and another end 59 disposed near the bottom of the bowl 35. The time delay relay device 50 is adjusted to open the solenoid valve 34 in the conduit 27, via the timer 75, when or after the flushing is completed and before the opening of the solenoid valve 40 (as controlled by another time delay relay device 60) which would lead to inflow of fresh water into the toilet bowl 35. The valve 34 is opened for a preset sufficient length of time, as controlled by the timer 75, to further remove any residual gray water and wastes remaining in the bowl 35 through the syphon tube 57 to the passageway 39 via the eductor 37. The eductor 37 is so located as to maintain the desired water level in the bowl 35. A check valve 36 and an anti-syphon valve 54 are provided to prevent the contamination of the fresh water supply. The anti-syphon valve 54 serves to prevent continuous syphoning of newly supplied water from the bowl 35 to the fresh water supply. Further, a strainer 55 is installed at the open end 59 of the syphon tube 57 to prevent materials such as toilet paper from entering and clogging the syphon tube 57.

The time delay relay device 60, which is actuated by the switch 29 upon lowering of the float 28, is preset to operate to open the solenoid valve 40 in the conduit 65 only after the gray water and wastes in the toilet bowl 35 are completely or almost completely removed by the above-described syphon device. The conduit 65, which supplies pressurized fresh water to the toilet fixture, forks to form two branch conduits 42 and 43. The branch conduit 42 leads to an overflow tube 44 located in the water closet 26, while the branch conduit 43 leads to the water closet 26. In addition to being a conduit for supplying fresh water to the toilet bowl 35, the overflow tube 44 also functions to prevent the possibility of water overrunning the water closet 26. A manual valve 48 is installed in the branch conduit 42 and is normally in an open position. Also, as mentioned hereinbefore, the solenoid valve 41 in the branch conduit 43 is closed immediately by switch 29 upon flushing. With the valve 41 being closed and valve 48 being open, when the solenoid valve 40 is opened by operation of the time delay relay device 60, the pressurized fresh water is forced to flow through the branch conduit 42 and the overflow tube 44 to the toilet bowl 35. In contrast, no fresh water is conveyed through the branch conduit 43 to the water closet 26 which is always filled with gray water from the storage tank 11 except in those cases where there is an inadequate supply of gray water in the tank 11 or there is a power failure, as will be discussed in more detail below.

When the float 28 rises upon replenishment of the water closet 26 with gray water from the storage tank 11, the switch 29 is deactuated resulting in the opening of the solenoid valve 41 and the return of time delay devices 50, 60, and 70 to their original state. As a result, the pump 32 stops drawing gray water from the storage tank 11 to the water closet 26 and the solenoid valves 40 and 41 revert to their normal positions, i.e., valve 40 being normally closed and valve 41 being normally open. The level of fresh water in the toilet bowl 35 at the end of each flushing-filling cycle can be preset by adjusting the flow rate of fresh water via the manual valve 48 in the branch conduit 42 and by adjusting the delay set for the time delay relay device 60. Similarly, the level of fresh water in the toilet bowl 35 at the end of each flushing-filling cycle can be preset by adjusting the flow rate of fresh water via the manual valve 49 in the gray water supplying conduit 3 and by adjusting the delay set for the time delay relay device 70.

As mentioned hereinbefore, the toilet bowl 35 used in this embodiment has a partially concealed cavity 38 at its bottom. With a bowl of this type, any remaining gray water is largely concealed in the cavity 38 and cannot be readily seen by the user. However, a toilet bowl without a partially concealed cavity can also be used with this gray water recycling system in those applications where a minimum amount of gray water in the bottom of the bowl is not objectionable.

In case of power failure, no gray water can be pumped from the storage tank 11 to the water closet 26. The pump 32, as well as all other electrical devices mentioned above, is also rendered inoperative when the gray water level is low via the action of the float switch 16 and, resultantly, the closet 26 cannot be replenished with gray water after each flushing operation. In accordance with the embodiment shown in the drawing, an automatic back-up means is provided for operation of the gray water recycling system in either situation. More particularly, the low voltage DC source, which connects the time relay device 60 and the solenoid valve 40, is capable of opening the valve 40 during either main power failure or low supply of gray water via the switch 29 upon lowering of the float 28 in a flushing operation. With the opening of the valve 40, all three valves 40, 41, and 48 are now in an open position. Consequently, the pressurized fresh water is conveyed, through the conduit 42 and the overflow tube 44, to the toilet bowl 35 on the one hand, and conveyed, through the conduit 43, to the water closet 26 on the other hand. Once the water closet 26 is filled, the float 28 rises and actuates the switch 29 thereby returning the solenoid valve 40 to its normally closed position via a control relay in panel 51. As a result, at the completion of each flushing-filling operation cycle, both the water closet 26 and toilet bowl 35 are filled with fresh water.

It will be appreciated by those skilled in the art that the pump 32 may be replaced with a low voltage pump capable of operating on DC power in those applications where such may be desirable, e.g., in rural situations where power outages may affect the supply of fresh water.

There are other features provided in this embodiment which further improve the performance of the gray water recycling system disclosed herein. For example, to prevent the escape of any unpleasant odors of gray water from the water closet 26, a suitable seal 47 is provided between the water closet 26 and its cover 67. The cover 67 is removable so that the water closet 26 can be opened for service, maintenance, or addition of toilet chemicals as necessary. Further, a check valve 46 is installed to allow entry of air into the water closet 26 during flush cycle. Also, several additional manual valves 24, 68, and 69 are provided in the gray water recycling system for service purposes.

It will be noted that since gray water is typically of elevated temperature, the recycling system is also advantaged in that it serves to add heat to the facility in which the storage tank 11 is installed. Use of gray water of elevated temperature also prevents the water closet 26 from "sweating" (i.e., condensation of water on its surface) which occurs when the water in the closet 26 has a temperature lower than that of the ambience.

The foregoing description has been limited to a specific embodiment of this invention. It will be apparent, however, that variations and modifications may be made to the particularly described embodiment, with the attainment of some or all of the advantages of the invention. Therefore, it is the object of the appended claims to cover all such variations and modifications as come within the true spirit and scope of the invention.

What is claimed is:

1. A system of using gray water to dispose of wastes from a toilet fixture including a water closet, a toilet bowl having a cavity in a bottom portion thereof, and a conduit interconnecting the closet and the bowl, which system comprises
    means for pooling gray water,
    means for supplying the stored gray water to the closet,
    means for permitting flow through the conduit of gray water from the closet to the bowl,
    means for preventing flow through the conduit when the gray water in the closet is nearly depleted,
    means actuated when the flow through the conduit is prevented for substantially depleting gray water remaining in the cavity of the bowl, and
    means for supplying fresh water to the bowl wherein a substantial majority of the contents remaining in the bowl will be fresh water.

2. The system defined in claim 1, further comprising: first and second time delay devices,
    said first delay device operating to turn on said gray water supplying means with the delay time being set so that said gray water supplying means is turned on after gray water in the closet starts flowing to the bowl, said second delay device operating to turn on said fresh water supplying means with the delay time being set so that said fresh water supplying means is turned on after gray water in the bowl is substantially depleted, and means for actuating said first and second time delay devices upon lowering of water level in the closet and for terminating operations induced by said delay devices upon rising of water level in the closet to a preset level.

3. The system defined in claim 2, wherein said actuating and terminating means includes a switch in connection with a float.

4. The system defined in claim 1, wherein said gray water supplying means includes a water pump in connection with water pipes.

5. The system defined in claim 1, wherein said depleting means is a syphon tube with one end disposed near the bottom of the bowl and the other end leading to an outlet below the bowl.

6. The system defined in claim 1, wherein said depleting means includes a syphon tube with one end disposed near the bottom of the bowl and the other end connected to a water suction device which leads to an outlet below the bowl.

7. The system defined in claim 6, further comprising an additional time delay device which operates to turn on and off said water suction device at preset time intervals.

8. The system defined in claim 1, further comprising a member adapted to be connected to the inside front of the bowl for partially covering the cavity disposed at the bottom of the bowl so as to conceal from view any gray water in the cavity.

9. The system defined in claim 1, further comprising means for supplying fresh water to the closet, and wherein both means for supplying fresh water to the bowl and to the closet are subject to an automatic control means.

10. The system defined in claim 9 wherein said automatic control means is powered by a stored energy source, whereby the fixture remains operative during limited electrical power outages.

11. The system defined in claim 1, further comprising means for separating solid particles from gray water before its storage.

12. The system defined in claim 1, further comprising means for dispensing disinfectant material to the stored gray water.

13. The system defined in claim 1, wherein the closet is sealed so as to prevent the escape of odors of gray water.

14. A process of using gray water to dispose of wastes from a toilet fixture including a water closet, a toilet bowl having a cavity in a bottom portion thereof, and a conduit interconnecting the closet and the bowl, which comprises the following steps:

pooling the gray water from various sources into a tank, supplying the pooled gray water to the closet, permitting flow through the conduit to permit flow of gray water from the closet to the bowl, preventing flow through the conduit when gray water in the closet is nearly depleted, substantially depleting gray water remaining in the cavity of the bowl after the flow through the conduit is prevented, and supplying fresh water to the bowl wherein a substantial majority of the contents remaining in the bowl will be fresh water.

15. The process defined in claim 14, further comprising:

the step of actuating first and second time delay devices upon lowering of water level in the closet, and the step of terminating operations induced by said delay devices upon rising of water level in the closet to a preset level, wherein said first delay device operating to supply gray water to the closet after gray water in the closet starts flowing to the bowl, and said second delay device operating to supply fresh water to the bowl after gray water in the bowl is substantially depleted.

16. The process defined in claim 14, further comprising the step of separating solid particles from gray water.

17. The process defined in claim 14, further comprising the step of adding disinfectant material to gray water after the pooling step.

18. The process defined in claim 14, wherein the depleting step includes draining gray water in the bowl through a syphon tube.

19. The process defined in claim 14, further comprising the step of supplying fresh water to the closet, and wherein both said steps of supplying fresh water to the bowl and to the closet are subject to an automatic control means.

20. The process defined in claim 19, further comprising the step of powering the automatic control means by a stored energy source, whereby the fixture remains operative during limited electrical power outages.

21. The process defined in claim 14, further comprising the step of concealing from view gray water in the cavity of the bowl.

* * * * *